United States Patent

Hirschmann, Jr.

[15] 3,649,106
[45] Mar. 14, 1972

[54] MANUALLY FORMABLE SPECTACLE TEMPLE

[72] Inventor: Jack B. Hirschmann, Jr., Bourne, Mass.
[73] Assignee: H. L. Bouton Company, Inc., Buzzards Bay, Mass.
[22] Filed: July 2, 1970
[21] Appl. No.: 51,941

[52] U.S. Cl. ............................. 351/117, 351/114, 351/119, 351/122, 351/178
[51] Int. Cl. ........................................ G02c 5/18, G02c 5/16
[58] Field of Search .................. 351/117, 111, 114, 118, 119, 351/122, 178

[56] References Cited

UNITED STATES PATENTS

| | | | |
|---|---|---|---|
| 2,538,830 | 1/1951 | Collinson | 351/117 X |
| 1,845,807 | 2/1932 | Nerney | 351/114 X |
| 1,605,474 | 11/1926 | Schumacher | 351/117 |

Primary Examiner—David Schonberg
Assistant Examiner—Robert L. Sherman
Attorney—Marechal, Biebel, French & Bugg

[57] ABSTRACT

A reinforced spectacle temple includes a reinforcing wire enclosed within front a rear sections of plastic of relatively different properties. The front section is hard and resistant to deformation, while the rear section is soft and readily formable manually with the wire to fit the ear and head of the wearer. The two plastic sections are mechanically interlocked, and the rear section may be rotated on the reinforcing wire to accommodate the slope of the portion of the wearer's head with which it is in engagement.

11 Claims, 7 Drawing Figures

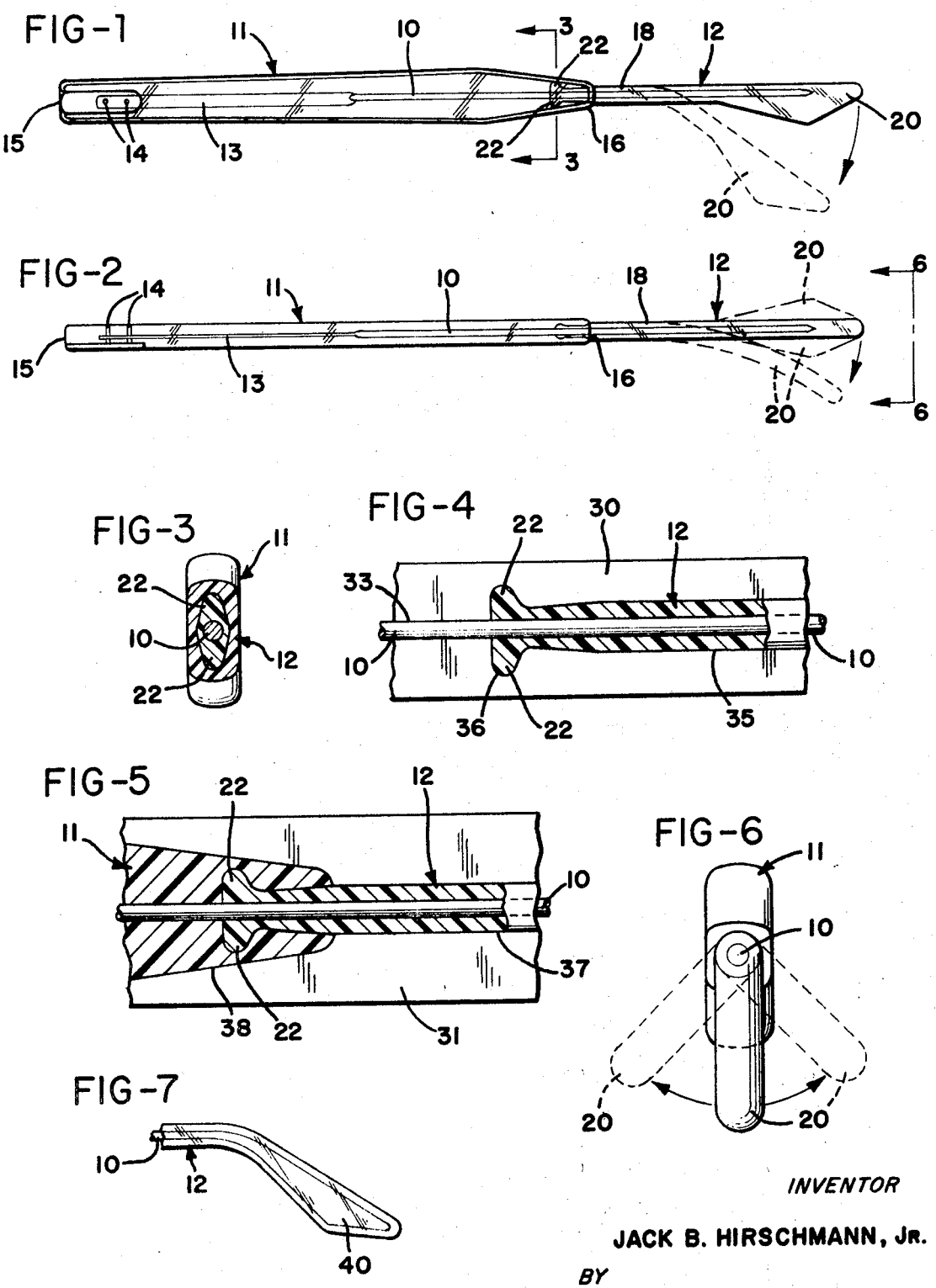

3,649,106

MANUALLY FORMABLE SPECTACLE TEMPLE

BACKGROUND OF THE INVENTION

Spectacle temples used for conventional glasses or for safety glasses are generally formed or fitted in one of several ways. The entire temple is generally formed of relatively rigid plastic material which is molded around a reinforcing wire, and the rear portion thereof is formed to fit the wearer's ear while it is softened by the application of heat. Fitting these temples entails estimating the length from the bridge to the top of the wearer's ear, dipping the rear portion in a hot substance to soften the plastic, and bending the wire and the softened plastic to fit the ear. Often this hit-or-miss procedure must be duplicated several times to achieve a comfortable fit.

In the so-called "cable" temple, the entire temple, or at least the rear end, is generally formed by molding a relatively flexible plastic material around a flexible cable to produce a rear portion which is flexible, but which is relatively nondeformable and has a preset curl for curling around the ear of the wearer. These rear portions are, in a sense adjustable to length, since the curl may be stretched to different lengths. But due to the inherent bias in the preset curl, these rear portions are often uncomfortable and pinch the wearer's ear. Furthermore, since the plastic material used in this type of temple is flexible but relatively nondeformable, to change the length of the temple so that the curl in the rear portion will coincide with the top of the wearer's ear is essentially the only choice a wearer has respecting a comfortable fit. As a result, industrial establishments must not only keep a large supply of varying length temples on hand, but also must permit employees to spend valuable time selecting suitably comfortable temples.

SUMMARY OF THE INVENTION

The present invention is directed to an improved temple which is readily adjustable in length without preliminary softening. In general, the spectacle temple includes a rear section of relatively soft, manually formable plastic material interlocked to a front section of relatively nondeformable plastic material, and a relatively rigid but manually formable reinforcing wire is embedded longitudinally through both sections.

In the preferred embodiment of the invention, the soft rear section includes an elongated central portion which extends between a forward portion and an enlarged rearward portion. The rear section is molded around the rear portion of the wire and is formed with a pair of integral lugs on the forward end thereof. The front section is then molded around the remaining front portion of the wire and around the integral lugs of the rear section to form a firm interlock between the front and rear sections.

The interlock prevents the rear section from being forcibly removed from the front section and allows the elongated central portion thereof to be readily formed to adjust for length. The central portion may also be formed laterally to fit the curvature of the wearer's head, if desired. Thirdly, the enlarged rearward portion may be rotatably twisted about the wire to provide a comfortable fit against the wearer's head. All of these adjustments may be made by the wearer himself without heating or other treatment, and for most people, a single length temple may be used.

BRIEF DESCRIPTION OF THE DRAWING

FIG. 1 is an elevation of the spectacle temple of the present invention, and showing the rear section adjusted for length (dotted lines);

FIG. 2 is a top view of the spectacle temple of FIG. 1 and showing the rear section formed laterally (dotted lines) and rotatably twisted about the central wire (dot-dash lines);

FIG. 3 is an enlarged section on its line 3—3 in FIG. 1;

FIG. 4 is a partially cutaway sectional view showing the rear section molded around the central wire, with only one of a pair of representative matching molds being shown;

FIG. 5 is a partially cutaway sectional view showing the front section molded around the central wire and the forward portion of the rear section, with only one of a pair of second representative matching molds being shown;

FIG. 6 is an enlarged end view taken along line 6—6 in FIG. 2 and showing (dot-dash lines) twisted positions of the rear section; and FIG. 7 is a partial view of a modified form of the rear section.

DETAILED DESCRIPTION OF THE PREFERRED EMBODIMENTS

Referring to FIG. 1, the spectacle temple of the present invention includes an elongated wire 10 embedded in a combination front support section 11 and a rear ear-engaging section 12, and the wire 10 has the usual flattened forward end portion 13 provided with holes 14 for the usual hinge-attaching rivets. The front section 11 is preferably a relatively nondeformable plastic material, while the rear section 12 which is adapted to be bent over the ear of the wearer, is preferably a relatively soft, manually formable plastic material. These parts are interlocked or coupled together by a sequential molding process.

The rigid front section 11 extends from its front engaging forward end 15 rearwardly along the side of wearer's head to its rearward end 16. The soft rear section 12 includes an elongated, generally cylindrical central portion 18 which extends between a forward portion and an enlarged rear portion 20. The rear portion 20 preferably has a generally flat paddle-like or fish-tail configuration, as shown. The height of section 11 (FIG. 1) is preferably greater than its width (FIG. 2), and this comparative difference is utilized in the formation of a rigid interlock between the front section 11 and the rear section 12.

The means by which this interlock is formed include a pair of integral lugs 22 which define a head-like configuration at the forward end of the rear plastic section 12, the overall vertical dimension of the combination lugs 22 being substantially greater than the adjacent portion 18, but the maximum horizontal dimensions of these parts may be essentially the same. The rearward end 16 of the forward section 11 is complementarily recessed for receiving the lugs 22 in surrounding and interlocking relation, with the rearmost end of the forward section 11 enclosing the forward end portion of the cylindrical central portion 18 of the rear section 12.

The new spectacle temple of the present invention is readily formed by sequentially injecting fluid plastic molding compounds between a first pair of multi-cavity molds 30 (FIG. 4) and then between a second pair of multi-cavity molds 31 (FIG. 5), only one cavity of each of these molds being shown. Referring to FIG. 4, the first mold 30 has a cavity portion 33 for receiving and retaining the wire 10 in predetermined position. Another cavity portion 35 has a configuration for forming the soft section 12 and therefore includes an oblong space 36 for forming the lugs 22. The wire 10 is positioned within the mold at its desired location, and a fluid plastic molding compound such as polyvinyl chloride is injected into the cavity 35. When the plastic compound is allowed to harden by cooling, it forms the relatively soft, formable rear section 12 which may be adjusted for length without heating or other treatment, as discussed hereinafter.

The molded rear section and outwardly protruding wire are then removed from mold 30 and inserted into mold 31 (FIG. 5) in a cavity portion 37 formed to receive at least a portion of the forward end of the rear section 12. A second fluid plastic compound such as acetate butyrate or cellulose acetate is injected into a second cavity portion 38 formed to define the front section 11. Cavity portion 38 overlaps the forward end of rear section 12, and consequently the plastic flows around the lugs 22 to form the desired interlocking means as the plastic cools and hardens.

There are many plastic compounds which are suitable for the front and rear sections of the present invention. The front section 11 should be formed of a plastic compound which is relatively nondeformable and becomes rigid enough upon hardening to maintain its shape under harsh treatment. Acetate butyrate and cellulose acetate are merely examples of plastic compounds which have this desirable property, and are relatively rigid when hardened. Similarly, the rear section 12 should be formed of a plastic compound which hardens to a relatively soft condition capable of being manually twisted, polyvinyl chloride being only one example of a suitable compound for this purpose. The plastic compounds used for each section need not be solvent welded or chemically bonded together upon molding. The interlock can be solely mechanical in nature, if desired, although some bonding is not undesirable.

Because the rear plastic section 12 does not bond or adhere to the metal wire 10, which is merely embedded within it, its central and rearward portions 18 and 20 are rotatably twistable about the wire 10 (FIG. 6). The forward rigid section 11 is effectively prevented from being rotated about the wire 10 by its own rigidity and by its flattened forward end 13. The rigid interlock between the front and rear sections accordingly secures and prevents the lugs 22 from being turned under the application of rotary force to the rearward portion 20. The central and rearward portions 18 and 20 are therefore free to be adjusted for length without requiring softening.

In order to obtain the maximum adjustment in accordance with the invention, the relative lengths of the front and rear sections 11 and 12 should be such that the wire 10 can be bent selectively along the length of the central portion 18 to provide for proper engagement with the ear and adjacent portion of the head of a particular wearer. For example, one wearer may wish the temples to hook around the upper part of his ear, and wire 10 can be correspondingly bent in hook shape. Another wearer may wish an essentially skull grip engagement, which would call for bending of the rear portion of the wire both downwardly and inwardly but to considerably less of a hook shape than in the first case. Satisfactory results from this standpoint have been obtained with the front and rear sections approximately 4 inches and 2 inches long, respectively.

Bending adjustments of this type are illustrated by the dash lines in FIGS. 1 and 2. A third adjustment, which is illustrated by the dot and dash lines in FIGS. 2 and 6, involves rotation of the plastic section 12 about the portion of the wire 10 therewithin to fit smoothly against the skull of the wearer in the mastoid bone area. This adjustment will take place naturally as the temples are set in place on the wearer's head if the rearward portion of the wire 10 is circular. It is possible, however, within the practice of the invention to prevent free rotational movement of rear section 12 while still making it possible for it to be fitted by a twisting movement, and this is readily done by flattening or otherwise forming the wire 10 to unsymmetrical shape, such as the fish-tail shown at 40 in the plastic section 12' in FIG. 7.

From the foregoing description and accompanying drawing, it is apparent that certain advantages and features are presented by the present invention. The formable rear section provides a substantial degree of adjustability as to length, since the selected amount of the wire reinforcement immediately rearward of the rigid plastic piece can be straightened or bent as desired for appropriate location around the ear. The manual formability of the rear section in three different directions, without the application of heat, significantly facilitates the fitting of the temple to the side of the wearer's head and over the wearer's ear. For retail optical outlets and opticians, the new spectacle temple effectively eliminates the need for maintaining hot solutions or other heat applying means for softening temples for adjustment purposes. Moreover, when the temple is uncomfortable, the wearer himself may form it to suit his own liking.

The present invention is also particularly suitable for use in safety glasses. If the temples are subjected to rough treatment, for example, the wearer can quickly readjust them, slip the formable sections over his ears, and with one finger press the rotatable rearward portion against his mastoid bone. Furthermore, due to the high degree of adjustability, industrial establishments are relieved of the burden of keeping a large supply of different length temples on hand.

While the method and article herein described constitute preferred embodiments of the invention, it is to be understood that the invention is not limited to this precise method and article, and that changes may be made therein without departing from the scope of the invention.

What is claimed is:

1. A spectacle temple comprising a relatively straight front support section of plastic material including a forward end adapted to be connected to a spectacle frame, means reinforcing said front section against deformation including a wire embedded within said front section and projecting therebeyond, said wire being relatively rigid but manually formable, a rear temple section enclosing said projecting wire and including a rearward end portion of generally flat configuration for engagement with the side of the head of the wearer, said rear section being formed of plastic material which is relatively soft and manually formable without heating or other preliminary treatment to provide for conjoint selective bending of said section and said wire enclosed therein without heating or other preliminary treatment to effect maximum accommodation of said rearward end portion to comfortable engagement with the ear and side of the head of the wearer, and means holding said rearward end portion against movement lengthwise of said wire.

2. A spectacle temple as defined in claim 1 wherein said formable rear section includes an elongated portion extending in enclosing relation with said wire between said generally flat rearward end portion thereof and said front section, said central portion being of smaller cross-section than said flat end portion to facilitate bending thereof with said wire enclosed therein.

3. A spectacle temple as defined in claim 2 wherein said elongated portion is generally cylindrical to facilitate bending thereof at any position the realong for adjustment of said temple for length.

4. A spectacle temple as defined in claim 2 wherein said front section comprises relatively hard plastic material having the rearward end thereof molded in interlocked relation with the forward end of said rear section.

5. A spectacle temple as defined in claim 1 wherein the portion of said wire enclosed within said rear temple section is cylindrical to provide for rotational movement of said flat rearward end portion about said wire to fit the slope of the wearer's mastoid bone.

6. A spectacle temple as defined in claim 1 wherein the portion of said wire enclosed within said rear temple section is unsymmetrical in radial section to hold said flat plastic end portion against rotational movement on said wire while still providing for fitting thereof to the side of the head of the wearer by twisting thereof with said wire.

7. A spectacle temple comprising a rear ear-engaging section formed of a relatively soft, manually formable plastic material and having an elongated central portion extending between a forward portion with an enlarged cross-section and a rearward portion, a front support section formed of a relatively non-deformable plastic material and having a rearward end molded around said forward portion to receive said forward portion in interlocking relation therein, a formable reinforcing wire embedded within said front and rear sections, and said central and rearward portions of said rear section being formable to adjust said temple for length and being rotatably twistable about said wire to fit the temple to the contour of the wearer's head.

8. A spectacle temple comprising a forward portion including a forward end adapted to be connected to a spectacle frame and also including a rearward end part, a rearward portion including a forward end part and also a rearward end part of generally flat configuration for engagement with the side of the head of the wearer, connecting means between said rearward end part of said forward portion and said forward end part of said rearward end portion constructed to secure said parts against movement toward and away from each other, and means supporting said flat rearward end part for rotational movement with respect to said forward portion about an axis extending generally in the direction of the length of said rearward end part to provide for maximum accommodation of said part to comfortable engagement with the side of the head of the wearer.

9. A spectacle temple as defined in claim 8 comprising a wire incorporated in both of said forward and rearward portions, said wire including a rearward end part embedded in and defining the axis for said rotational movement of said rearward portion of said temple.

10. A spectacle temple comprising a relatively straight forward portion including a forward end adapted to be connected to a spectacle frame and also including a rearward end part, a rearward portion including a forward end part and also a rearward end part of generally flat configuration for engagement with the side of the head of the wearer, connecting means between said rearward end part of said forward portion and said forward end part of said rearward end portion constructed to secure said portions together with said rearward portion extending downwardly with respect to said forward portion in the operative position of the spectacle frame, and means supporting said flat rearward end portion for rotational movement with respect to said straight portion about an axis extending generally in the direction of the length thereof to provide for maximum accommodation of said portion to comfortable engagement with the side of the head of the wearer.

11. A spectacle temple comprising a wire member including a relatively straight portion adapted for connection at the forward end thereof to a spectacle frame and also including a rearward end portion extending downwardly with respect to said forward portion, a rearward end member of generally flat configuration mounted for rotational movement on said downwardly extending portion of said wire member to provide for maximum accommodation of said part to comfortable engagement with the side of the head of the wearer, and means securing said rearward end member against movement axially of said wire member.

* * * * *